United States Patent
Barcelos et al.

(10) Patent No.: US 11,775,408 B2
(45) Date of Patent: Oct. 3, 2023

(54) SPARSE INTENT CLUSTERING THROUGH DEEP CONTEXT ENCODERS

(71) Applicant: ADP, INC., Roseland, NJ (US)

(72) Inventors: Allan Barcelos, Porto Alegre (BR);
Fernanda Tosca, Porto Alegre (BR);
Israel Oliveira, Porto Alegre (BR);
Leandro Bianchini, Porto Alegre (BR);
Renata Palazzo, Porto Alegre (BR)

(73) Assignee: ADP, INC., Roseland, NJ (US)

( * ) Notice: Subject to any disclaimer, the term of this patent is extended or adjusted under 35 U.S.C. 154(b) by 420 days.

(21) Appl. No.: 16/983,146

(22) Filed: Aug. 3, 2020

(65) Prior Publication Data

US 2022/0035722 A1 Feb. 3, 2022

(51) Int. Cl.
*G06F 16/35* (2019.01)
*G06F 11/30* (2006.01)
*G06N 3/045* (2023.01)
*G06N 3/084* (2023.01)

(52) U.S. Cl.
CPC .......... *G06F 11/3072* (2013.01); *G06F 16/35* (2019.01); *G06N 3/045* (2023.01); *G06N 3/084* (2013.01)

(58) Field of Classification Search
None
See application file for complete search history.

(56) References Cited

U.S. PATENT DOCUMENTS

| | | | | |
|---|---|---|---|---|
| 6,263,337 | B1 * | 7/2001 | Fayyad | G06F 18/2321 |
| 7,251,637 | B1 * | 7/2007 | Caid | G06V 10/451 |
| | | | | 706/26 |
| 9,715,495 | B1 * | 7/2017 | Tacchi | G06F 40/30 |
| 11,042,776 | B1 * | 6/2021 | Buhler | G06V 10/945 |
| 2003/0052875 | A1 * | 3/2003 | Salomie | G06T 17/20 |
| | | | | 345/419 |
| 2006/0095521 | A1 * | 5/2006 | Patinkin | G06Q 10/107 |
| | | | | 709/206 |
| 2006/0259475 | A1 * | 11/2006 | Dehlinger | G06F 16/93 |

* cited by examiner

*Primary Examiner* — Tarek Chbouki
*Assistant Examiner* — Loan T Nguyen
(74) *Attorney, Agent, or Firm* — Foley & Lardner LLP

(57) ABSTRACT

A method of sparse intent clustering is provided. The method comprises identifying features in a number of electronic user reports created by a user and contained in a database, wherein the features include a title and description. The features of each user report are encoded into a binary vector. The binary vector for each user report is fed into an autoencoder neural network that creates a N-dimensional vector representing the user report. The float vectors representing the user reports are projected into a N-dimensional space. The float vectors are clustered according to cosine similarities, wherein each vector cluster represents an intent of the user in creating the reports. The intent of each vector cluster is then labeled.

17 Claims, 10 Drawing Sheets

US 11,775,408 B2

SPARSE INTENT CLUSTERING THROUGH DEEP CONTEXT ENCODERS

BACKGROUND INFORMATION

1. Field

The present disclosure relates generally to an improved computer system and, in particular, to a method of determining the intent behind user generated reports and providing suggested features for new reports based on features of past reports that match the intent of users in creating the new reports.

2. Background

Organizations typically produce routine reports documenting activities related to the organizations. Increasingly these reports are electronic in form and are created with specialize applications.

Every report created by reporting applications has a purpose and objective resulting from the intent of the report owner/creator. However, a wide set of potential features to include in a report can overwhelm users, resulting in confusion regarding which fields, filters, and derived or calculated fields should be included. Working through these possibilities to arrive at the optimal combination of features for a new report can potentially be time consuming and inefficient.

SUMMARY

An illustrative embodiment provides a computer-implemented method of sparse intent clustering. The method comprises identifying features in a number of electronic user reports created by a user and contained in a database, wherein the features include a title and description. The features of each user report are encoded into a binary vector. The binary vector for each user report is fed into an autoencoder neural network that creates a N-dimensional vector representing the user report. The float vectors representing the user reports are projected into a N-dimensional space. The float vectors are clustered according to cosine similarities, wherein each vector cluster represents an intent of the user in creating the reports. The intent of each vector cluster is then labeled.

Another illustrative embodiment provides a system for sparse intent clustering. The system comprises a storage device configured to store program instructions and one or more processors operably connected to the storage device and configured to execute the program instructions to cause the system to: identify features in a number of electronic user reports created by a user and contained in a database, wherein the features include a title and description; encode the features of each user report into a binary vector; feed the binary vector for each user report into an autoencoder neural network, wherein the autoencoder neural network generates a N-dimensional float vector representing the user report; project the float vectors representing the user reports into a N-dimensional space; cluster the float vectors into vector clusters according to cosine similarities, wherein each vector cluster represents an intent of the user in creating the reports; and label the intent of each vector cluster.

Another illustrative embodiment provides a computer program product for sparse intent clustering. The computer program product comprises a computer-readable storage medium having program instructions embodied thereon to perform the steps of: identifying features in a number of electronic user reports created by a user and contained in a database, wherein the features include a title and description; encoding the features of each user report into a binary vector; feeding the binary vector for each user report into an autoencoder neural network, wherein the autoencoder neural network generates a N-dimensional float vector representing the user report; projecting the float vectors representing the user reports into a N-dimensional space; clustering the float vectors into vector clusters according to cosine similarities, wherein each vector cluster represents an intent of the user in creating the reports; and labeling the intent of each vector cluster.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take into account that a wide set of potential features to include in a report can overwhelm users, resulting in confusion regarding which fields, filters, and derived or calculated fields should be included. The illustrative embodiments recognize and take into account that working through these possibilities to arrive at the optimal combination of features for a new report can potentially be time consuming and inefficient.

The illustrative embodiments also recognize and take into account that even when users do not know which features should be included in a report, the users do know their purpose and intent in creating the report. However, current applications that perform massive logging of user actions during creation of reports do not recognize the context or objective of those user actions.

The illustrative embodiments apply machines learning to determine the intent of a user in creating a new report. By determining connectivity between features in reports, the illustrative embodiments map patterns of features to intent that can be used to suggest constituent features to a user creating a new report based on the intent of that new report.

Figure 1:
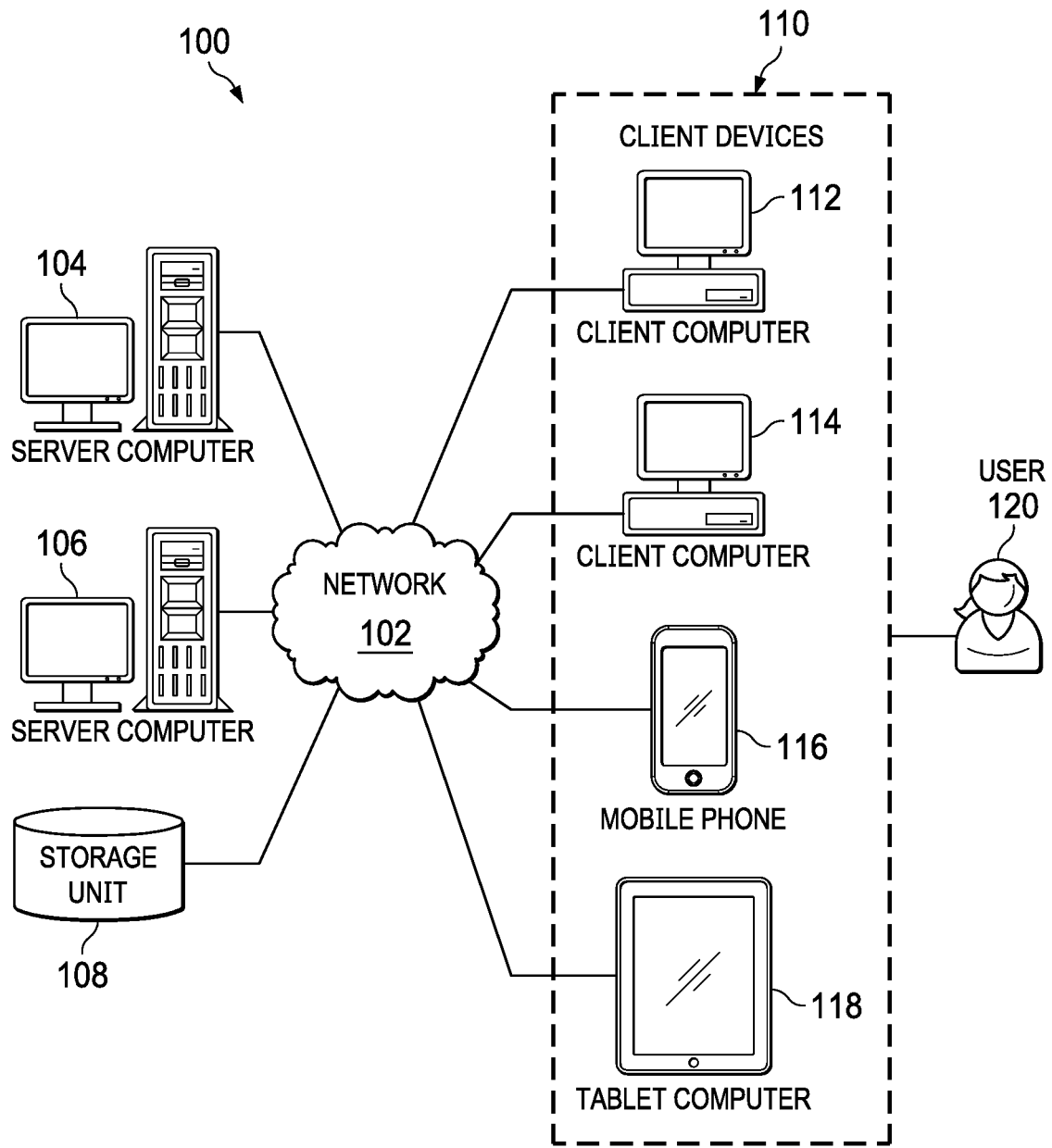
FIG. 1 depicts a block diagram of an information environment in accordance with an illustrative embodiment.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112 and client computer 114. Further, client devices 110 can also include other types of client devices such mobile phone 116 and tablet computer 118. Client devices 110 can be, for example, computers, workstations, or network computers. In the depicted example, server computer 104 provides information, such as boot files, operating system images, and applications to client devices 110. In this illustrative example, server computer 104, server computer 106, storage unit 108, and client devices 110 are network devices that connect to network 102 in which network 102 is the communications media for these network devices.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). Network 102 may be comprised of the Internet-of-Things (IoT). FIG. 1 is intended as an example, and not as an architectural limitation for the different illustrative embodiments.

Figure 2:
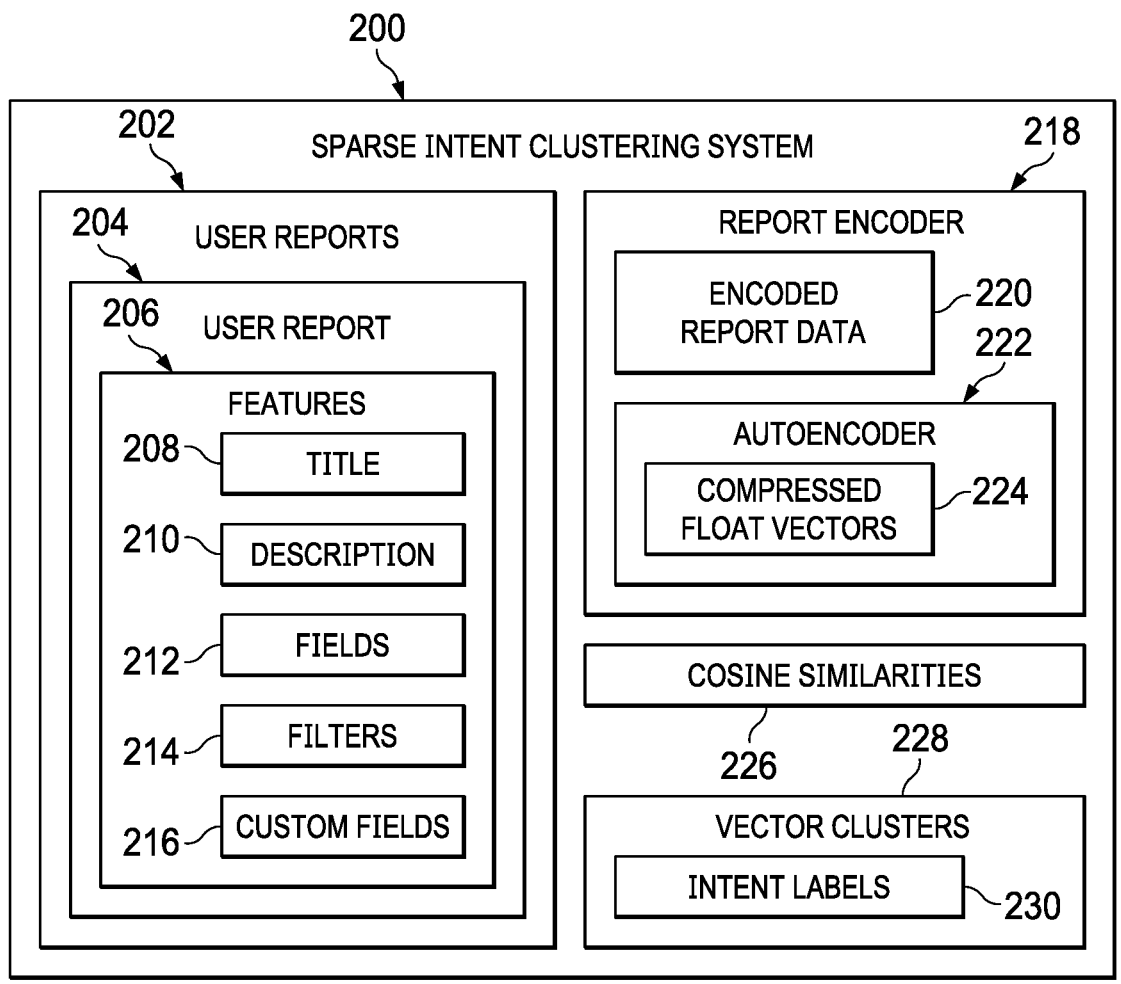
FIG. 2 depicts a block diagram of a sparse intent clustering system in accordance with an illustrative embodiment.

FIG. 2 depicts a block diagram of a sparse intent clustering system in accordance with an illustrative embodiment. sparse intent clustering system 200 might be implemented in a computing environment such as network data processing system 100 and utilized by computing devices such as server computer 104 and 106 and client devices 110.

Sparse intent clustering system 200 collects a number of electronic user reports 202 previously created by a user. These reports might be stored in a database. Each user report 204 comprises a number of features 206. The features 206 might include a title 208, description 210, reports fields 212, filters 214, and custom (derived or coded) fields 216.

The reports 202 are fed into a report encoder 218 that pre-processes the reports to generate encoded report data 220 in the form of binary vectors. Autoencoder 222 generates compressed float vectors 224 from the encoded report data 220.

Sparse intent clustering system 200 calculates cosine similarities 226 between the compressed float vectors 224 generated by the autoencoder 222. Based on the cosine similarities 226, sparse intent clustering system 200 can designate a number of vector clusters 228 that share common features. These common features can be used to identify the intent behind the creation of the reports. From these identified intents, the vector clusters 228 are provided with intent labels 230 that can be compared to new user reports (explained below).

Sparse intent clustering system 200 can be implemented in software, hardware, firmware, or a combination thereof. When software is used, the operations performed by sparse intent clustering system 200 can be implemented in program code configured to run on hardware, such as a processor unit. When firmware is used, the operations performed by sparse intent clustering system 200 can be implemented in program code and data and stored in persistent memory to run on a processor unit. When hardware is employed, the hardware may include circuits that operate to perform the operations in sparse intent clustering system 200.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

These components can be located in a computer system, which is a physical hardware system and includes one or more data processing systems. When more than one data processing system is present in the computer system, those data processing systems are in communication with each other using a communications medium. The communications medium can be a network. The data processing systems can be selected from at least one of a computer, a server computer, a tablet computer, or some other suitable data processing system.

By comparing the similarities of past reports created by a user, the illustrative embodiments utilize deep machine learning to analyze user history and develop a user profile. This profile can be used to specialize reports for a user based on the user's needs. When the system learns what type of report the user is creating it can provide suggestions for report features based on previous similar reports created by the user.

There are three main categories of machine learning: supervised, unsupervised, and reinforcement learning. Supervised machine learning comprises providing the machine with training data and the correct output value of the data. During supervised learning the values for the output are provided along with the training data (labeled dataset) for the model building process. The algorithm, through trial and error, deciphers the patterns that exist between the input training data and the known output values to create a model that can reproduce the same underlying rules with new data. Examples of supervised learning algorithms include regression analysis, decision trees, k-nearest neighbors, neural networks, and support vector machines.

If unsupervised learning is used, not all of the variables and data patterns are labeled, forcing the machine to discover hidden patterns and create labels on its own through the use of unsupervised learning algorithms. Unsupervised learning has the advantage of discovering patterns in the data with no need for labeled datasets. Examples of algorithms used in unsupervised machine learning include k-means clustering, association analysis, and descending clustering.

Whereas supervised and unsupervised methods learn from a dataset, reinforcement learning methods learn from feedback to re-learn/retrain the models. Algorithms are used to train the predictive model through interacting with the environment using measurable performance criteria.

Figure 3:
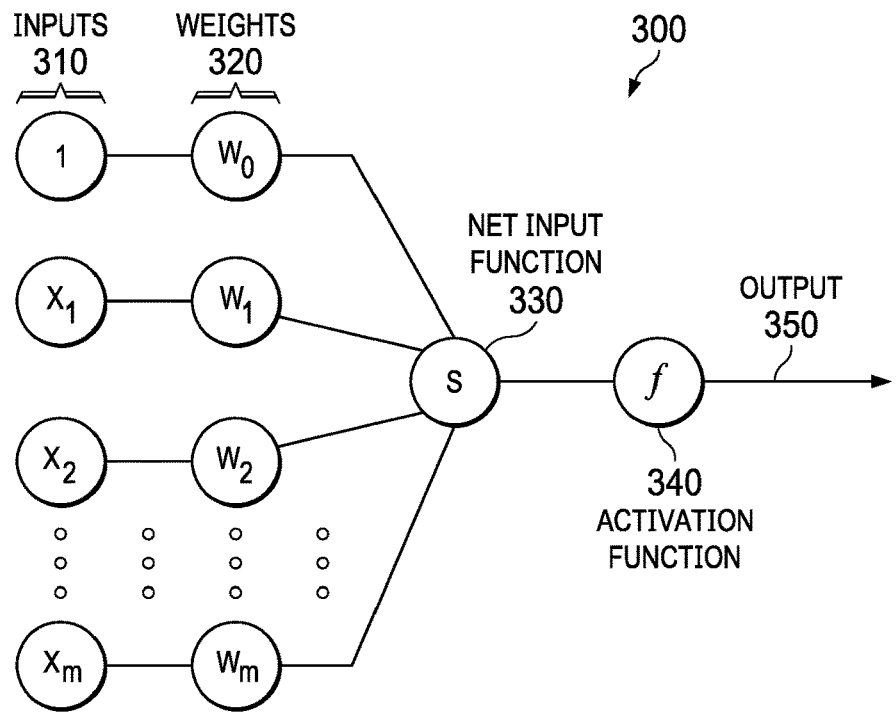
FIG. 3 is a diagram that illustrates a node in a neural network in which illustrative embodiments can be implemented.

FIG. 3 is a diagram that illustrates a node in a neural network in which illustrative embodiments can be implemented. Node 300 combines multiple inputs 30 from other nodes. Each input 310 is multiplied by a respective weight 320 that either amplifies or dampens that input, thereby assigning significance to each input for the task the algorithm is trying to learn. The weighted inputs are collected by a net input function 330 and then passed through an activation function 340 to determine the output 350. The connections between nodes are called edges. The respective weights of nodes and edges might change as learning proceeds, increasing or decreasing the weight of the respective signals at an edge. A node might only send a signal if the aggregate input signal exceeds a predefined threshold. Pairing adjustable weights with input features is how significance is assigned to those features with regard to how the network classifies and clusters input data.

Neural networks are often aggregated into layers, with different layers performing different kinds of transformations on their respective inputs. A node layer is a row of nodes that turn on or off as input is fed through the network. Signals travel from the first (input) layer to the last (output) layer, passing through any layers in between. Each layer's output acts as the next layer's input.

Figure 4:
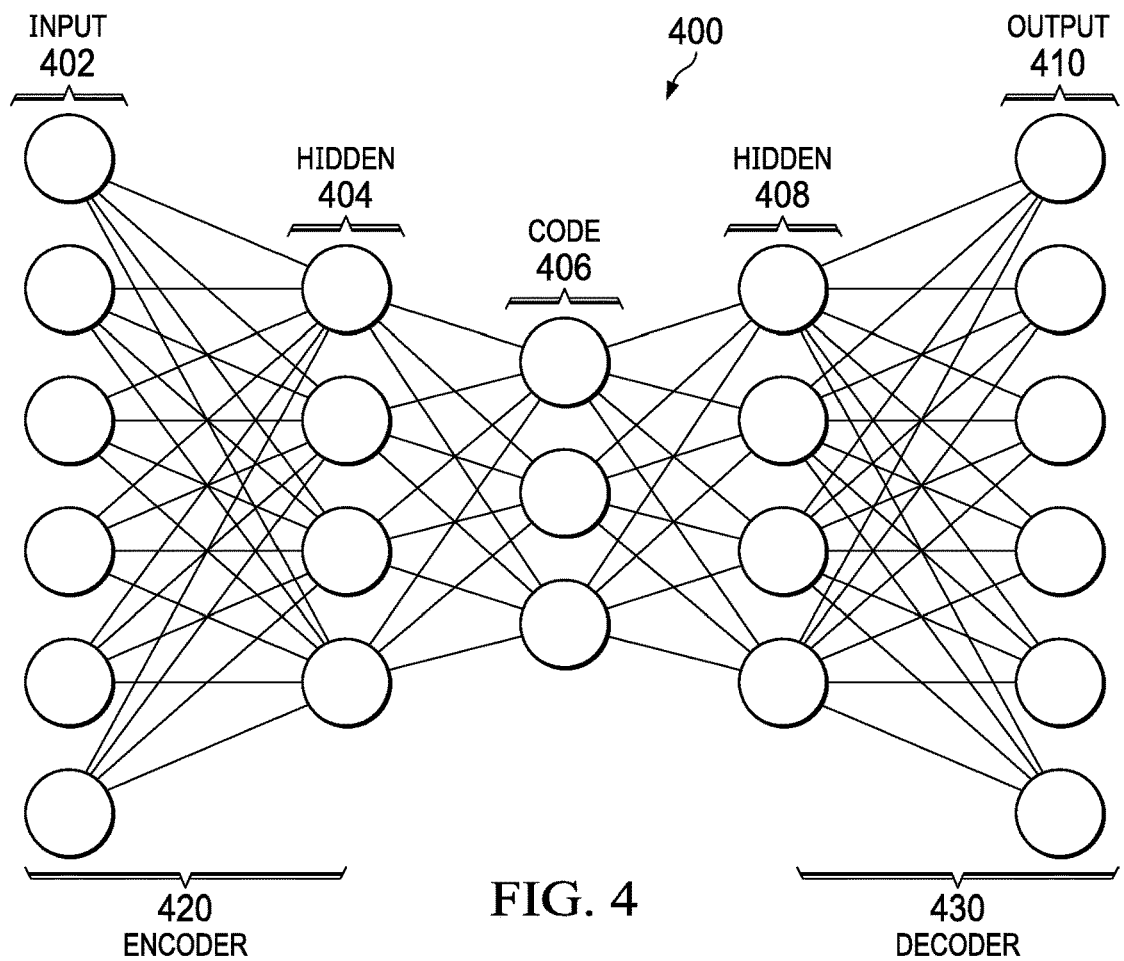
FIG. 4 depicts a sparse autoencoder neural network in which the illustrative embodiments can be implemented.

FIG. 4 depicts a sparse autoencoder neural network in which the illustrative embodiments can be implemented. Autoencoder 400 might be an example of autoencoder 222 in FIG. 2. Autoencoder 400 comprises a number of nodes, such as node 300 in FIG. 3, which are divided into several layers. An autoencoder is neural network that uses unsupervised learning to copy its input to its output. In the present example, autoencoder 400 comprises input layer 402 and output layer 410, which are visible layer. Located between input layer 402 and output layer 410 are hidden layers 404 and 408. In the center of autoencoder 400 is code layer 406.

Hidden layer 404 describes the code 406 used to represent the input data from input layer 402. Hidden layer 408 describes code 406 to represent output data for output layer 410. Input layer 402 and hidden layer 404 comprise encoder 420 that maps input data to code 406. Output layer 410 and hidden layer 408 comprise decoder 430 that maps code 406 to a reconstruction of the original input. Autoencoder 400 compresses data from the input layer 402 into a short code by ignoring noise when reconstructing the inputs.

Figures 5, 6:
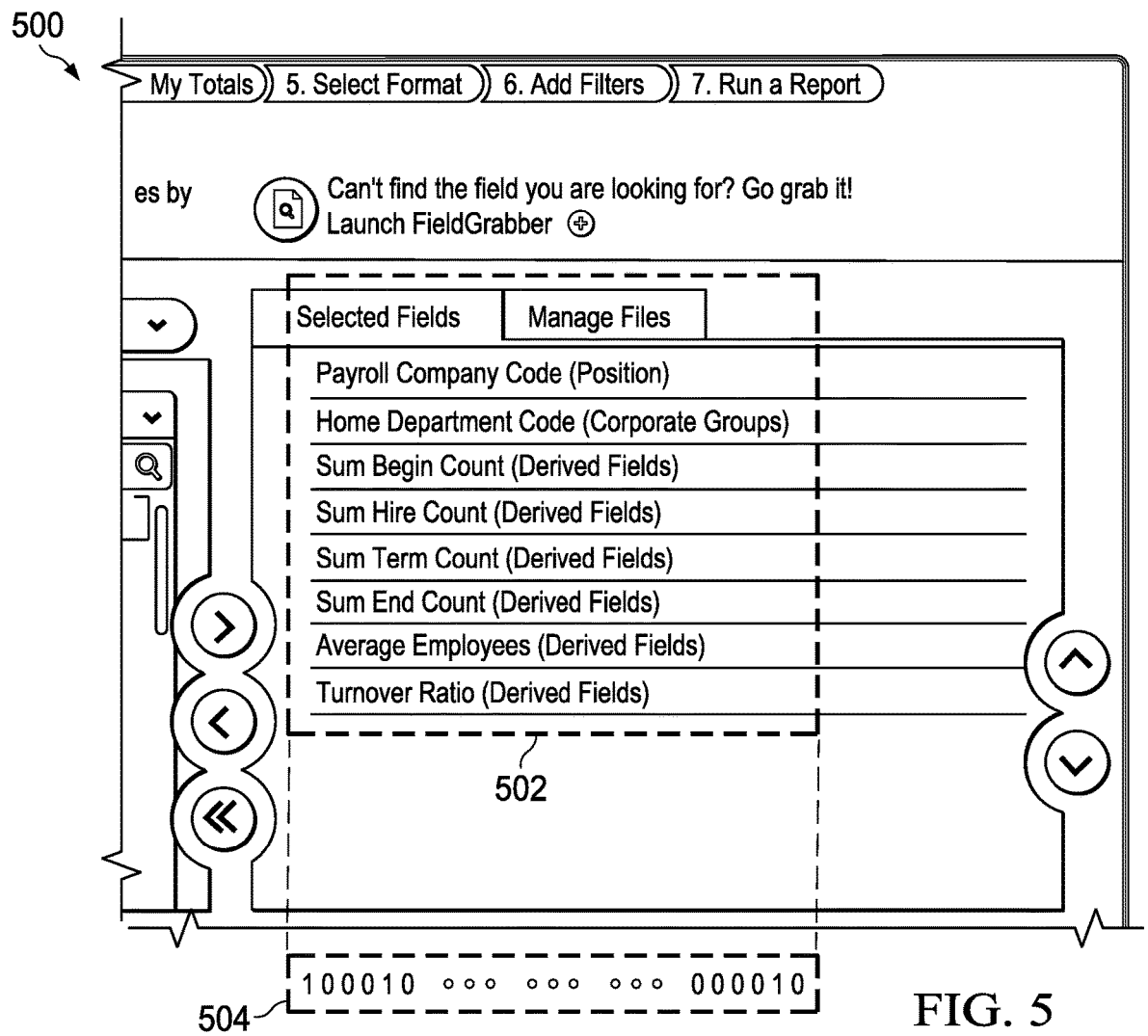
FIG. 5 illustrates the encoding of reports features in accordance with an illustrative embodiment.
FIG. 6 illustrates a matrix of encoded report vectors in accordance with an illustrative embodiment.

FIG. 5 illustrates the encoding of reports features in accordance with an illustrative embodiment. In the example shown, a user interface (UI) 500 displays a number of selected fields 502 that are included in a user report, such as e.g., user report 204 in FIG. 2. These selected fields can be encoded into a binary vector 504 representing the report, along with other features of the report.

FIG. 6 illustrates a matrix of encoded report vectors in accordance with an illustrative embodiment. After encoding, each report is represented by a binary vector $\overline{v}$. Each binary vector $\overline{v}$ comprises n dimensions R. The dimensions R represent features (e.g., title, fields, filters, custom fields, etc.). Each of the rows 602-608 in matrix 600 represents a different user report vector. Each column 604 represents a different report feature.

Figure 7:
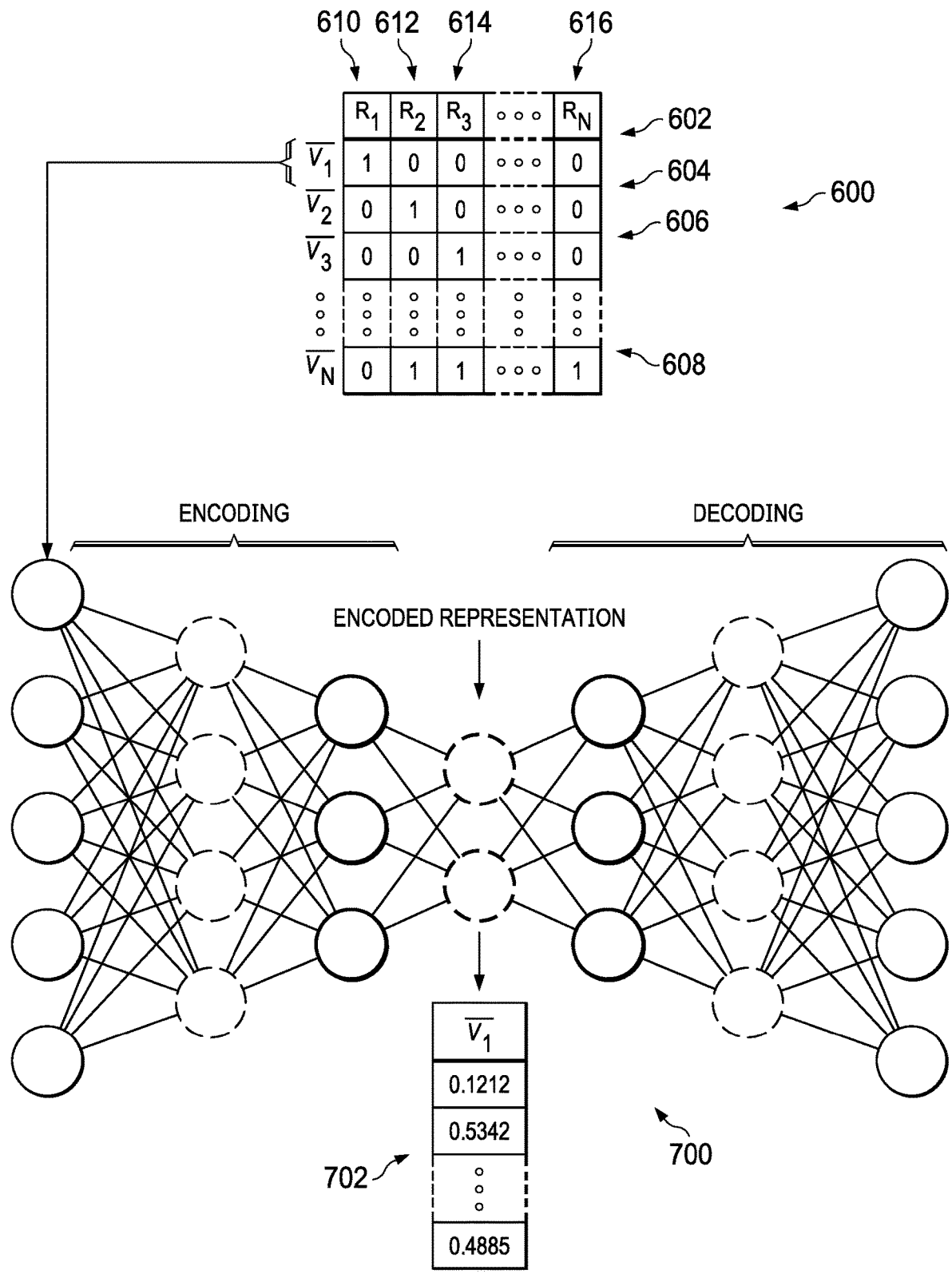
FIG. 7 illustrate the conversion of a binary vector into a compressed float vector by an autoencoder in accordance with an illustrative embodiment.
Figure 8:
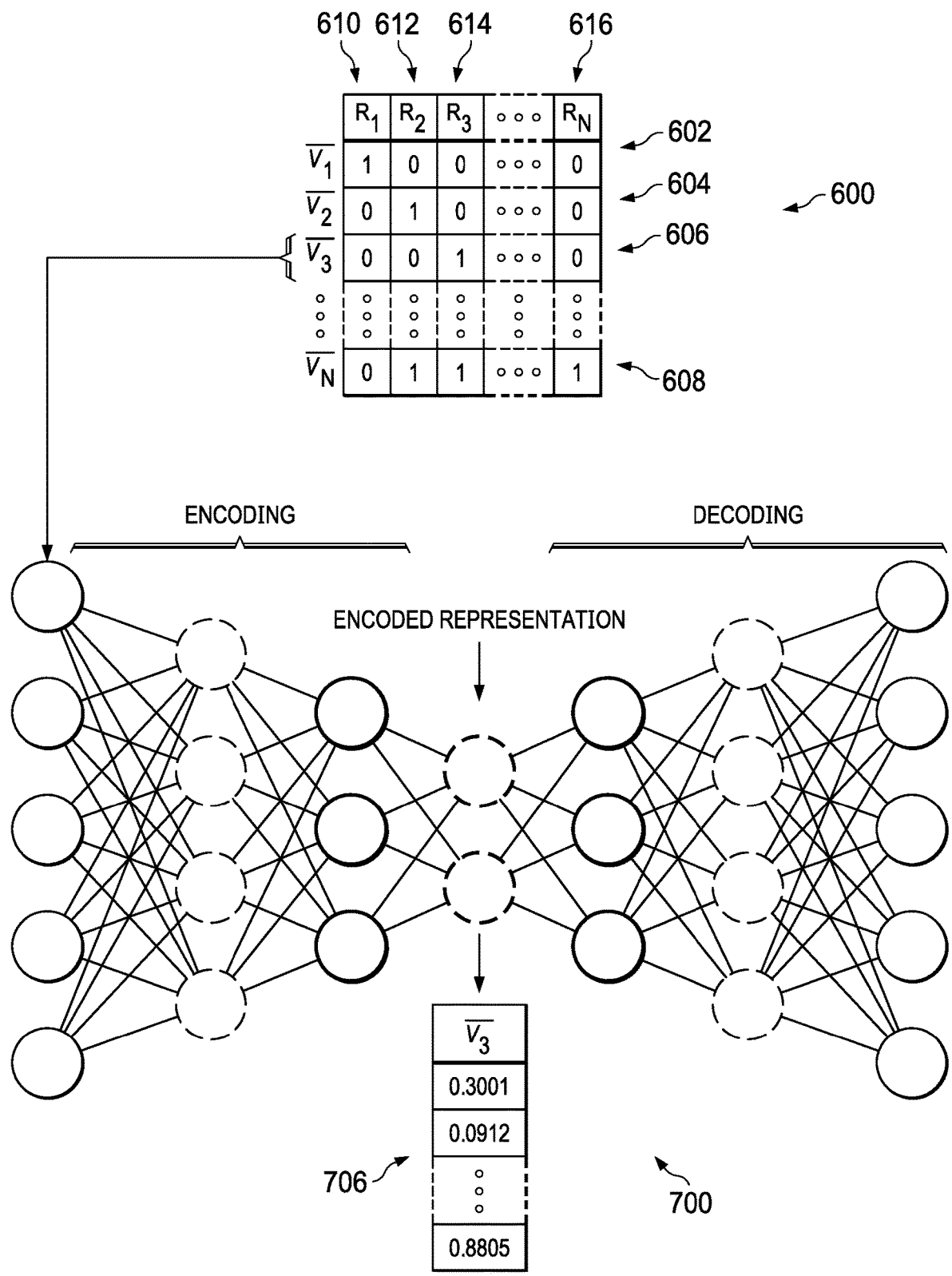
FIG. 8 illustrate the conversion of a binary vector into a compressed float vector by an autoencoder in accordance with an illustrative embodiment.
Figure 9:
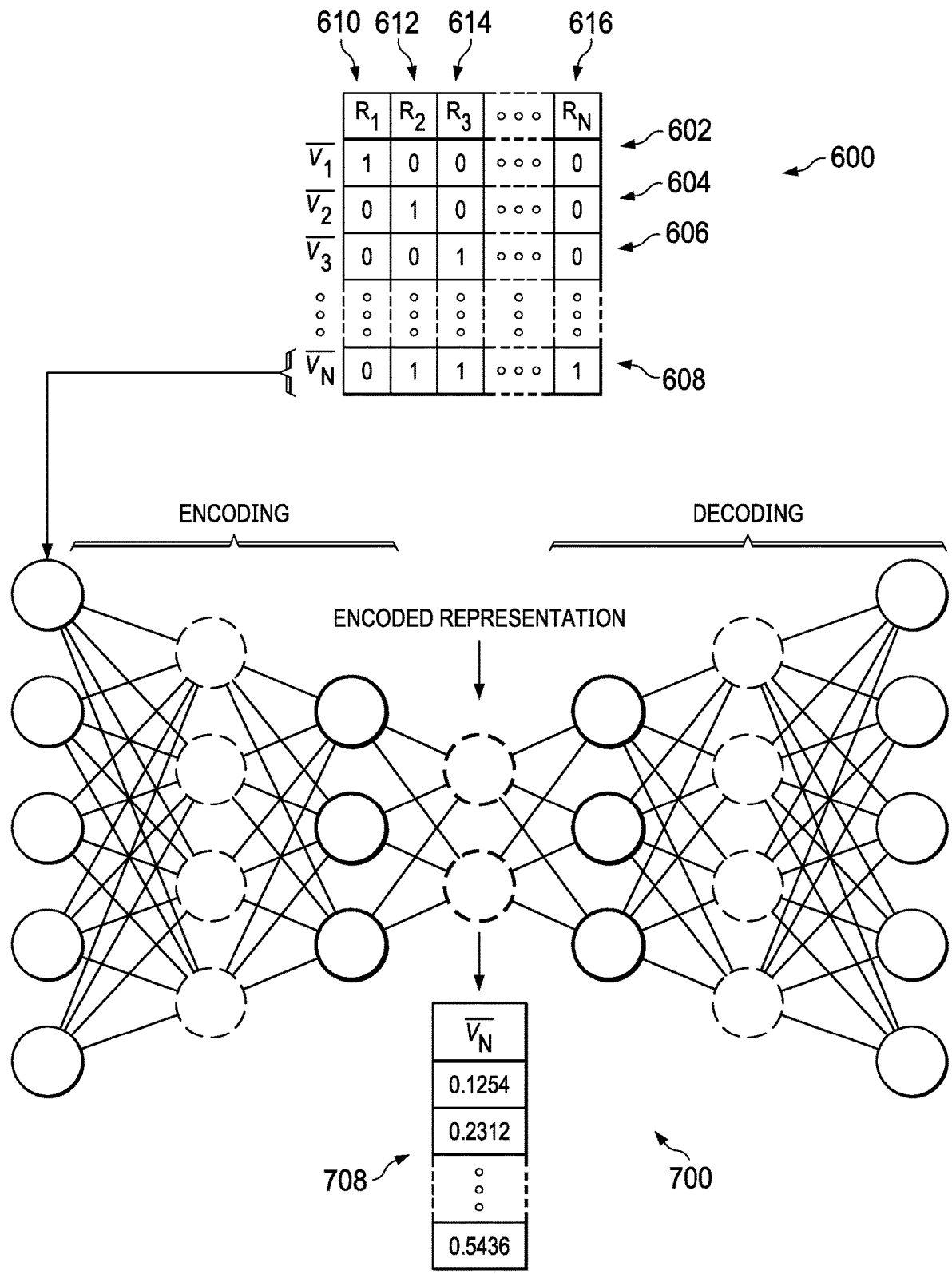
FIG. 9 illustrate the conversion of a binary vector into a compressed float vector by an autoencoder in accordance with an illustrative embodiment.

FIGS. 7-9 illustrate the conversion of binary vectors into compressed float vectors by an autoencoder in accordance with an illustrative embodiment. Each row of the matrix 600 is used as input to the pre-trained autoencoder network (e.g., autoencoder 222) to obtain a compressed float vector $\overline{v}_n$. The autoencoder receives binary input vectors comprising 1s and 0s and outputs float vectors comprising floating point numbers with fractional parts. Without the use of an autoencoder the calculations of such float vectors would take several years to perform manually.

FIG. 7 illustrates the conversion of binary vector $\overline{v}_1$ 602 into float vector 702 by autoencoder 700. FIG. 8 illustrates the conversion of binary vector $\overline{v}_3$ 606 into float vector 706 by autoencoder 700. FIG. 9 illustrates the conversion of binary vector $\overline{v}_n$ 608 into float vector 708 by autoencoder 700.

The illustrative embodiments use the float vectors to determine which features the reports have in common and how those shared features relate to the user intent behind the reports.

Figure 10:
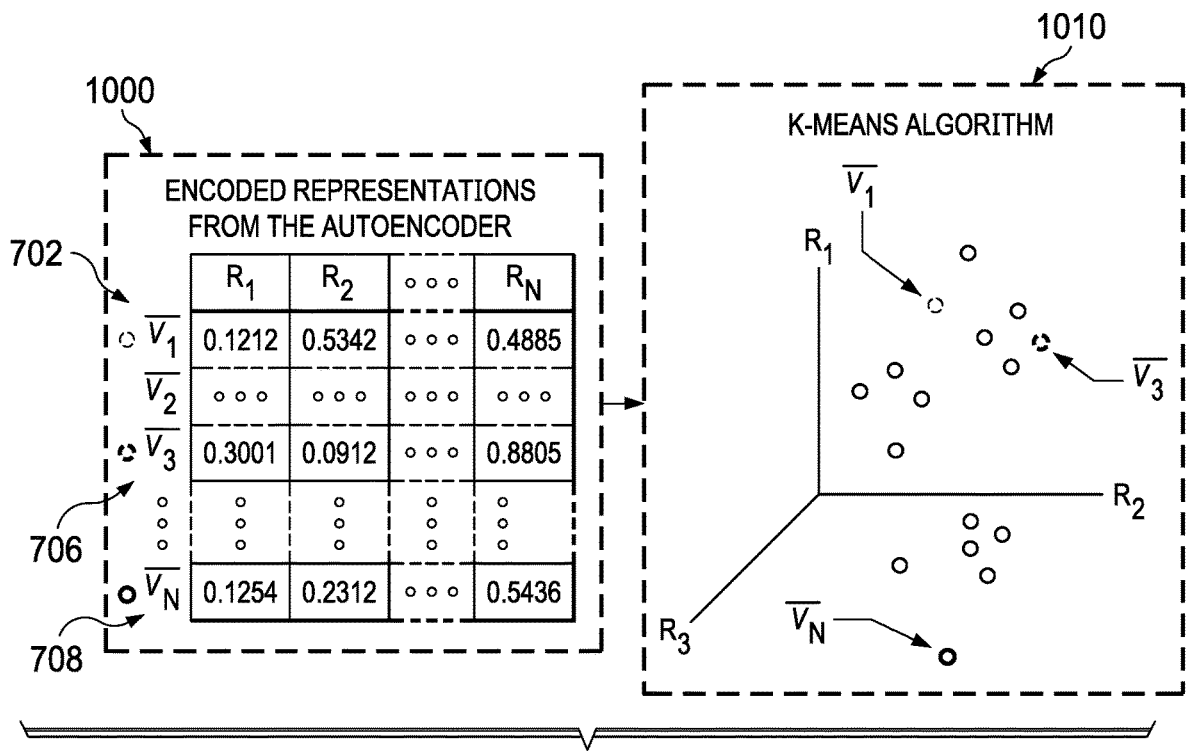
FIG. 10 illustrates the projection of compressed float vectors into an N-dimensional space in accordance with an illustrative embodiment.

FIG. 10 illustrates the projection of compressed float vectors into an N-dimensional space in accordance with an illustrative embodiment. The vectors $\overline{v}_1$ 702, $\overline{v}_3$ 706, and $\overline{v}_n$ 708 in matrix 1000 are the compressed float vectors generated by the autoencoder from the binary vectors in matrix 600. The float vectors are projected into a N-dimensional space 1010, wherein N is the number of dimensions R in the vectors representing possible features defined by the autoencoder architecture. For simplicity and ease of illustration, a three-dimensional space is depicted in FIG. 10, but it should be understood that a greater number of dimensions can be and typically would be used.

The compressed float vectors in matrix 1000 are used as inputs to a k-means algorithm that operates on N-dimensional space 1010. For ease of illustration only the projections of float vectors 702, 706, and 708 in N-dimensional space 1010 are shown in FIG. 10, but it should be understood that all float vectors in matrix 1000 are fed as input into the k-means algorithm.

Figure 11:
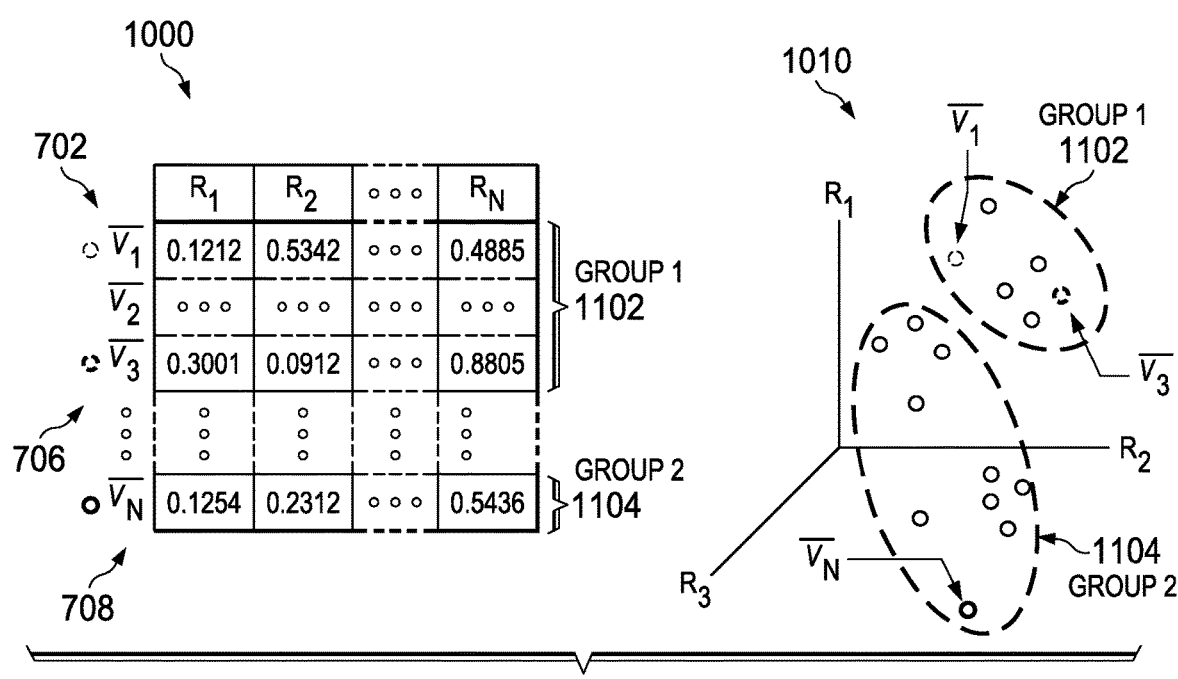
FIG. 11 illustrates clustering of float vectors in accordance with an illustrative embodiment.

FIG. 11 illustrates clustering of float vectors in accordance with an illustrative embodiment. Similarities among reports can be used to create groups of intents based on the characteristics of the reports encoded in the float vectors. The float vectors are clustered (grouped) according to their respective similarities. This grouping might be accomplished with k-means clustering according to cosine similarities between the compressed float vectors.

In the illustrated example, the report vectors are clustered into Group 1 1102 and Group 2 1104. Vectors that have cosine similarities above a defined threshold are clustered together. In an embodiment, the threshold is 0.5. In the example shown in FIG. 11, float vectors $\overline{v_1}$ 702, $\overline{v_3}$ 706 are included in Group 1 1102, and float vector $\overline{v_n}$ 708 is included in Group 2 1104.

The shared features producing the similarities among clustered reports reflects a similar underlying intent of the reports in each group, which is typically reflected in the title and description of the reports. Therefore, each cluster (group) can be labeled according to the identified intent of the reports comprising the cluster.

Figure 12:
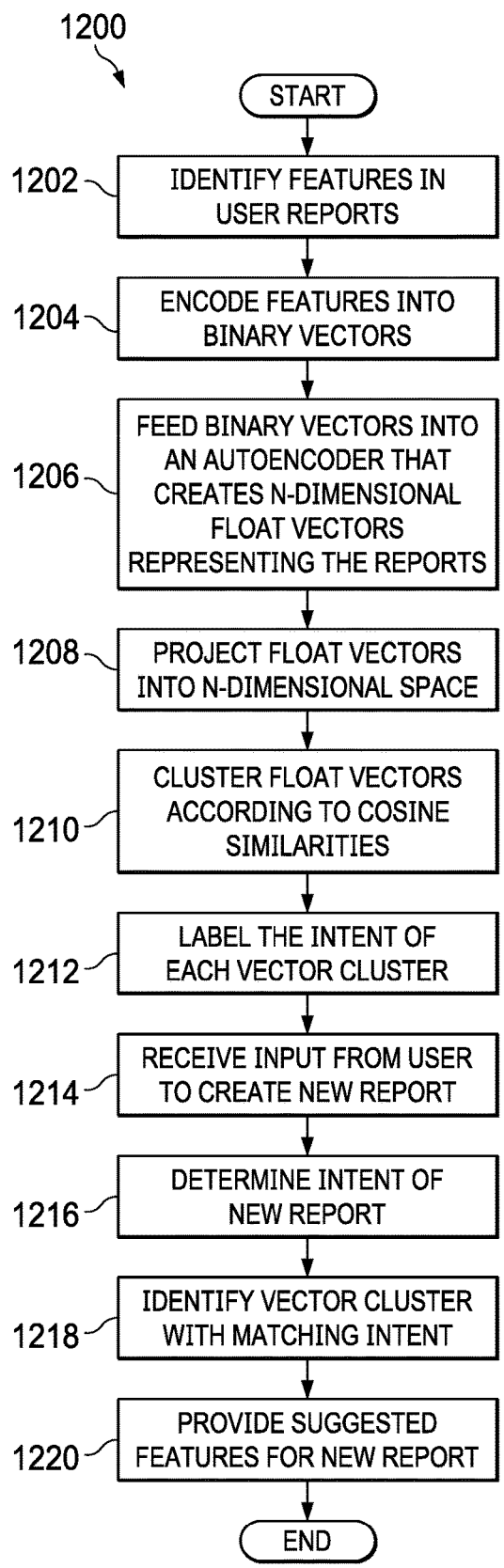
FIG. 12 depicts a flowchart illustrating a process of sparse intent clustering in accordance with an illustrative embodiment.

FIG. 12 depicts a flowchart illustrating a process of sparse intent clustering in accordance with an illustrative embodiment. The process in FIG. 12 can be implemented in hardware, software, or both. When implemented in software, the process can take the form of program code that is run by one of more processors located in one or more hardware devices in one or more computer systems. Process 1200 might be implemented in sparse intent clustering system 200 shown in FIG. 2.

Process 1200 begins by identifying features in a number of electronic user reports created by a user and contained in a database (step 1202). The features include a title and description. Features might also include fields, files, filters, and custom (derived or coded) fields. The features of each user report are then encoded into a binary vector (step 1204).

The encoded binary vector for each user report is fed into an autoencoder neural network that generate a N-dimensional compressed float vector representing the user report, wherein N is defined by the autoencoder architecture (step 1206).

The float vectors representing the user reports are projected into a N-dimensional space (step 1208).

The float vectors are then clustered into vector clusters according to cosine similarities (step 1210). The clustering might be accomplished with k-means clustering. Float vectors within each cluster have cosine similarities above a defined threshold, e.g., 0.5. Each vector cluster represents an intent of the user in creating the reports. The intent of each vector cluster is then labeled (step 1212).

If the user wishes to create a new report, the system receives input from the user to create a new user report (step 1214). The input includes a title and description for the new user report. Based on the title and description, the system determines the intent of the new user report (step 1216)

The system then identifies a vector cluster labeled with an intent that matches the intent of the new user report (step 1218). The user is then provided with suggested features for the new user report according to features in the vector cluster identified with the matching intent (step 1220). Process 1200 then ends.

Figure 13:
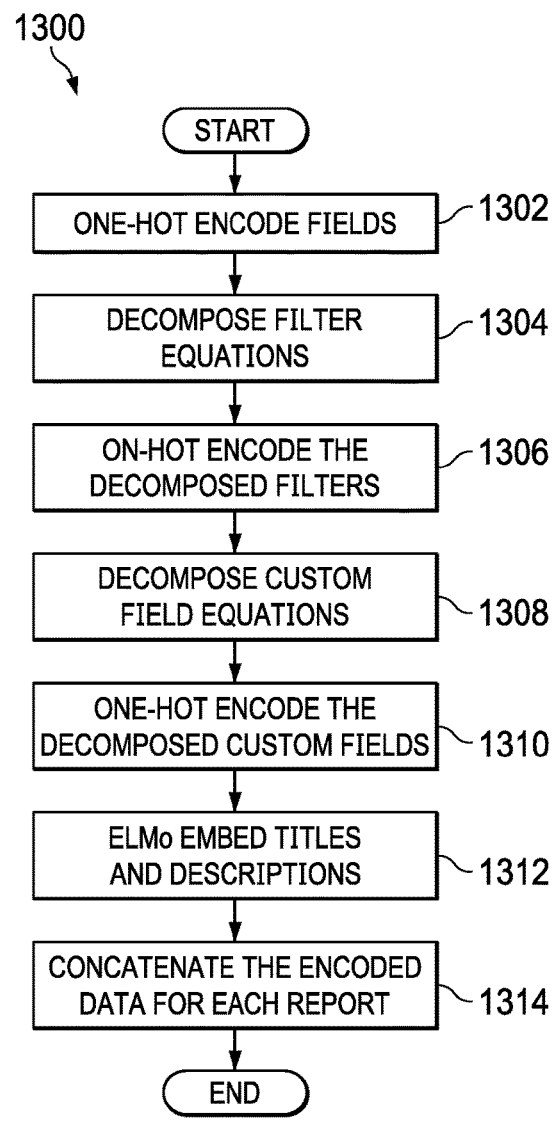
FIG. 13 depicts a flowchart illustrating a process of feature encoding in accordance with an illustrative embodiment.

FIG. 13 depicts a flowchart illustrating a process of feature encoding in accordance with an illustrative embodiment. The process in FIG. 13 can be implemented in hardware, software, or both. When implemented in software, the process can take the form of program code that is run by one of more processors located in one or more hardware devices in one or more computer systems. Process 1300 is a more detailed example of step 1204 shown in FIG. 12.

Process 1300 begins by one-hot encoding the fields in the user report (step 1302). One-hot encoding converts categorical (nominal) variables that contain label values rather than numeric values into integer data than can be applied to machine learning.

Process 1300 decomposes equations of filters in the user report to produce decomposed filters (step 1304). The decomposed filters are then one-hot encoded (step 1306).

Process 1300 also decomposes equations of custom fields in the user report to produce decomposed custom fields (step 1308) and one-hot encodes the decomposed custom fields (step 1310).

The title and description of the report are encoded with embeddings from language models (ELMo) (step 1312). ELMo is a technique in natural language processing (NLP) that models complex characteristics of word use and how that use varies across contexts.

The encoded data for each report is then concatenated and is ready to be fed into the autoencoder (step 1314). Process 1300 then ends.

Figure 14:
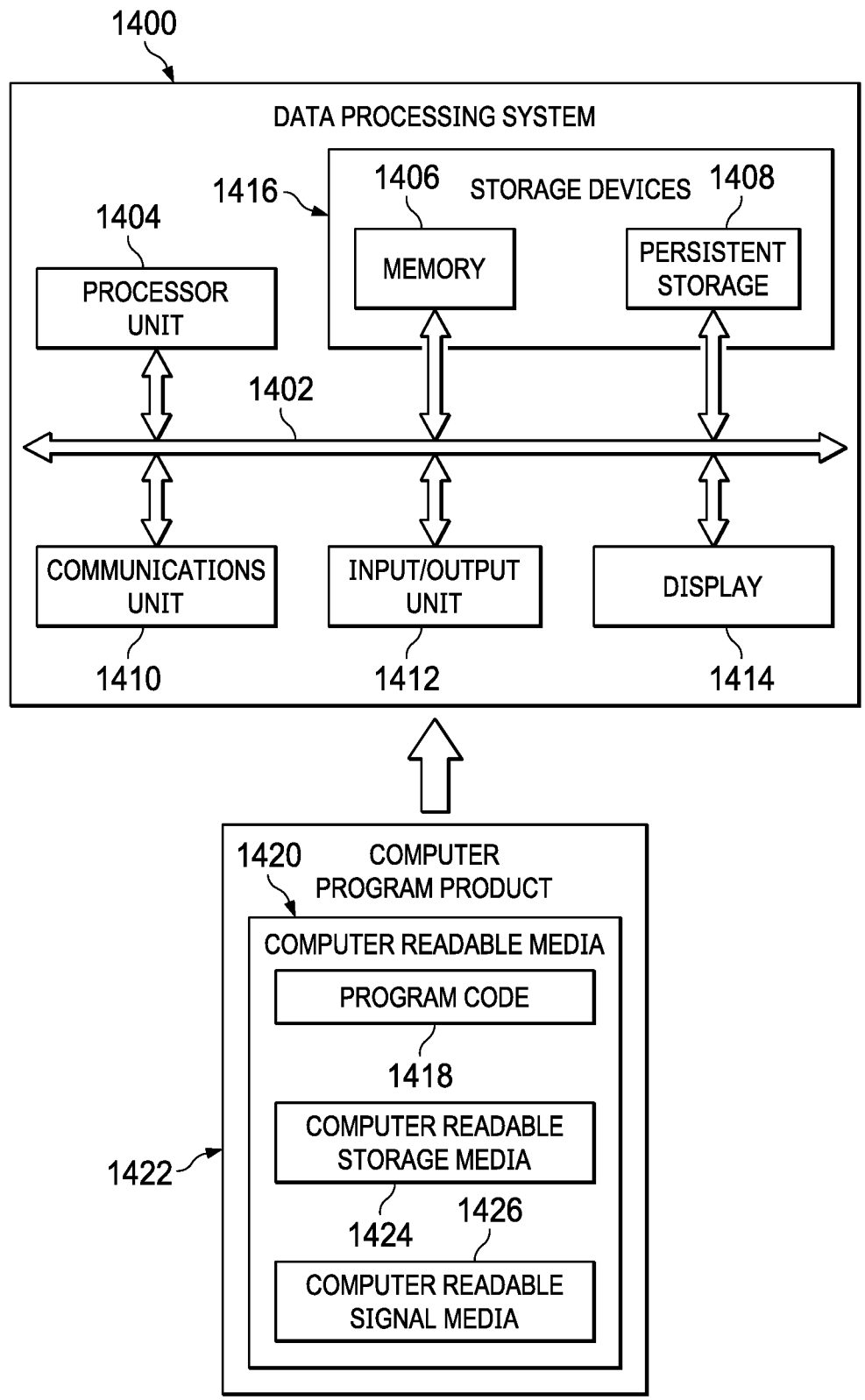
FIG. 14 is a block diagram of a data processing system in accordance with an illustrative embodiment.

Turning now to FIG. 14, an illustration of a block diagram of a data processing system is depicted in accordance with an illustrative embodiment. Data processing system 1400 may be used to implement one or more of server computers 104, 106 and client devices 110 in FIG. 1. In this illustrative example, data processing system 1400 includes communications framework 1402, which provides communications between processor unit 1404, memory 1406, persistent storage 1408, communications unit 1410, input/output unit 1412, and display 1414. In this example, communications framework 1402 may take the form of a bus system.

Processor unit 1404 serves to execute instructions for software that may be loaded into memory 1406. Processor unit 1404 may be a number of processors, a multi-processor core, or some other type of processor, depending on the particular implementation. In an embodiment, processor unit 1404 comprises one or more conventional general-purpose central processing units (CPUs). In an alternate embodiment, processor unit 1404 comprises one or more graphical processing units (CPUs).

Memory 1406 and persistent storage 1408 are examples of storage devices 1416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1416 may also be referred to as computer-readable storage devices in these illustrative examples. Memory 1416, in these examples, may be, for example, a random access memory or any other suitable volatile or non-volatile storage device. Persistent storage 1408 may take various forms, depending on the particular implementation.

For example, persistent storage 1408 may contain one or more components or devices. For example, persistent storage 1408 may be a hard drive, a flash memory, a rewritable optical disk, a rewritable magnetic tape, or some combination of the above. The media used by persistent storage 1408 also may be removable. For example, a removable hard drive may be used for persistent storage 1408. Communications unit 1410, in these illustrative examples, provides for communications with other data processing systems or devices. In these illustrative examples, communications unit 1410 is a network interface card.

Input/output unit 1412 allows for input and output of data with other devices that may be connected to data processing system 1400. For example, input/output unit 1412 may provide a connection for user input through at least one of a keyboard, a mouse, or some other suitable input device. Further, input/output unit 1412 may send output to a printer. Display 1414 provides a mechanism to display information to a user.

Instructions for at least one of the operating system, applications, or programs may be located in storage devices 1416, which are in communication with processor unit 1404 through communications framework 1402. The processes of the different embodiments may be performed by processor unit 1404 using computer-implemented instructions, which may be located in a memory, such as memory 1406.

These instructions are referred to as program code, computer-usable program code, or computer-readable program code that may be read and executed by a processor in processor unit 1404. The program code in the different embodiments may be embodied on different physical or computer-readable storage media, such as memory 1406 or persistent storage 1408.

Program code 1418 is located in a functional form on computer-readable media 1420 that is selectively removable and may be loaded onto or transferred to data processing system 1400 for execution by processor unit 1404. Program code 1418 and computer-readable media 1420 form computer program product 1422 in these illustrative examples. In one example, computer-readable media 1420 may be computer-readable storage media 1424 or computer-readable signal media 1426.

In these illustrative examples, computer-readable storage media 1424 is a physical or tangible storage device used to store program code 1418 rather than a medium that propagates or transmits program code 1418. Alternatively, program code 1418 may be transferred to data processing system 1400 using computer-readable signal media 1426.

Computer-readable signal media 1426 may be, for example, a propagated data signal containing program code 1418. For example, computer-readable signal media 1426 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1400 are not meant to provide architectural limitations to the manner in which different embodiments may be implemented. The different illustrative embodiments may be implemented in a data processing system including components in addition to or in place of those illustrated for data processing system 1400. Other components shown in FIG. 14 can be varied from the illustrative examples shown. The different embodiments may be implemented using any hardware device or system capable of running program code 1418.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of sparse intent clustering, the method comprising:
   using a number of processors to perform the steps of:
   identifying features in a number of electronic user reports created by a user and contained in a database, wherein the features include a title and description;

encoding the features of each user into a binary vector to form a matrix representing the number of electronic user reports, wherein each row of the matrix represents a vector of different user report and, each column of the matrix represents a different features of the features for the user report;

feeding the binary vector for each user report from the matrix into an autoencoder neural network, wherein the autoencoder neural network generates float vectors by generating a N-dimensional float vector representing the user report for each user report, and wherein the N-dimensional float vector comprises floating point numbers with fractional parts;

projecting the float vectors representing the user reports into a N-dimensional space;

clustering the float vectors into vector clusters according to cosine similarities, wherein each vector cluster represents an intent of the user in creating the reports;

labeling the intent of each vector cluster;

receiving input from the user to create a new user report, wherein the input includes a title and description for the new user report;

determining an intent of the new user report according to the input;

identifying a vector cluster labeled with an intent that matches the intent of the new user report; and providing the user with suggested features for the new user report according to features in the vector cluster identified with the matching intent.

2. The method of claim 1, wherein encoding the features of each user report comprises one-hot encoding a number of fields in the user report.

3. The method of claim 1, wherein encoding the features of each user report comprises:
decomposing equations of a number of filters in the user report to produce decomposed filters; and
one-hot encoding the decomposed filters.

4. The method of claim 1, wherein encoding the features of each user report comprises:
decomposing equations of a number of custom fields in the user report to produce decomposed custom fields; and
one-hot encoding the decomposed custom fields.

5. The method of claim 1, wherein encoding the features of each user report comprises encoding the title and description with embeddings from language models.

6. The method of claim 1, wherein vectors within each cluster have cosine similarities above 0.5.

7. A system for sparse intent clustering, the system comprising:
a storage device configured to store program instructions; and
one or more processors operably connected to the storage device and configured to execute the program instructions to cause the system to:
identify features in a number of electronic user reports created by a user and contained in a database, wherein the features include a title and description;
encode the features of each user report into a binary vector to form a matrix representing the number of electronic user reports, wherein each row of the matrix represents a vector of different user report and, each column of the matrix represents a different feature of the features for the user report;
feed the binary vector for each user report from the matrix into an autoencoder neural network, wherein the autoencoder neural network generates float vectors by generating a N-dimensional float vector representing the user report for each user report, and wherein the N-dimensional float vector comprises floating point numbers with fractional parts;
project the float vectors representing the user reports into a N-dimensional space;
cluster the float vectors into vector clusters according to cosine similarities, wherein each vector cluster represents an intent of the user in creating the reports;
label the intent of each vector cluster
receive input from the user to create a new user report, wherein the input includes a title and description for the new user report;
determine an intent of the new user report according to the input;
identify a vector cluster labeled with an intent that matches the intent of the new user report; and
provide the user with suggested features for the new user report according to features in the vector cluster identified with the matching intent.

8. The system of claim 7, wherein encoding the features of each user report comprises one-hot encoding a number of fields in the user report.

9. The system of claim 7, wherein encoding the features of each user report comprises:
decomposing equations of a number of filters in the user report to produce decomposed filters; and
one-hot encoding the decomposed filters.

10. The system of claim 7, wherein encoding the features of each user report comprises:
decomposing equations of a number of custom fields in the user report to produce decomposed custom fields; and
one-hot encoding the decomposed custom fields.

11. The system of claim 7, wherein encoding the features of each user report comprises encoding the title and description with embeddings from language models.

12. A computer program product for sparse intent clustering, the computer program product comprising:
a computer-readable storage medium having program instructions embodied thereon to perform the steps of:
identifying features in a number of electronic user reports created by a user and contained in a database, wherein the features include a title and description;
encoding the features of each user report into a binary vector to form a matrix representing the number of electronic user reports, wherein each row of the matrix represents a vector of different user report and, each column of the matrix represents a different feature of the features for the user report;
feeding the binary vector for each user report from the matrix into an autoencoder neural network, wherein the autoencoder neural network generates float vectors by generating a N-dimensional float vector representing the user report for each user report, and wherein the N-dimensional float vector comprises floating point numbers with fractional parts;
projecting the float vectors representing the user reports into a N-dimensional space;
clustering the float vectors into vector clusters according to cosine similarities, wherein each vector cluster represents an intent of the user in creating the reports; and labeling the intent of each vector cluster receiving input from the user to create a new user report, wherein the input includes a title and description for the new user report;

determining an intent of the new user report according to the input;

identifying a vector cluster labeled with an intent that matches the intent of the new user report; and providing the user with suggested features for the new user report according to features in the vector cluster identified with the matching intent.

13. The computer program product of claim 12, wherein encoding the features of each user report comprises one-hot encoding a number of fields in the user report.

14. The computer program product of claim 12, wherein encoding the features of each user report comprises:

decomposing equations of a number of filters in the user report to produce decomposed filters; and one-hot encoding the decomposed filters.

15. The computer program product of claim 12, wherein encoding the features of each user report comprises:

decomposing equations of a number of custom fields in the user report to produce decomposed custom fields; and one-hot encoding the decomposed custom fields.

16. The computer program product of claim 12, wherein encoding the features of each user report comprises encoding the title and description with embeddings from language models.

17. The computer program product of claim 12, wherein vectors within each cluster have cosine similarities above 0.5.

* * * * *